US011878528B2

(12) United States Patent
Arakane et al.

(10) Patent No.: US 11,878,528 B2
(45) Date of Patent: Jan. 23, 2024

(54) LIQUID EJECTION DEVICE, METHOD OF CONTROLLING LIQUID EJECTION DEVICE, AND NON-TRANSITORY COMPUTER-READABLE RECORDING MEDIUM THEREFOR

(71) Applicant: BROTHER KOGYO KABUSHIKI KAISHA, Nagoya (JP)

(72) Inventors: Satoru Arakane, Nagoya (JP); Shotaro Iida, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 58 days.

(21) Appl. No.: 17/585,753

(22) Filed: Jan. 27, 2022

(65) Prior Publication Data

US 2022/0242126 A1 Aug. 4, 2022

(30) Foreign Application Priority Data

Jan. 29, 2021 (JP) ................................ 2021-013140

(51) Int. Cl.
*B41J 2/165* (2006.01)

(52) U.S. Cl.
CPC ......... *B41J 2/16505* (2013.01); *B41J 2/1652* (2013.01); *B41J 2/16517* (2013.01); *B41J 2/16526* (2013.01); *B41J 2002/16567* (2013.01); *B41J 2002/16573* (2013.01)

(58) Field of Classification Search
CPC .. B41J 2/16505; B41J 2/16517; B41J 2/1652; B41J 2/16526; B41J 2002/16567; B41J 2002/16573
See application file for complete search history.

(56) References Cited

U.S. PATENT DOCUMENTS 6,070,959 A * 6/2000 Kanbayashi ......... B41J 2/04588 347/11

FOREIGN PATENT DOCUMENTS

JP 2012-131149 A 7/2012
JP 2016-175361 A 10/2016

* cited by examiner

*Primary Examiner* — Geoffrey S Mruk
(74) *Attorney, Agent, or Firm* — Merchant & Gould P.C.

(57) ABSTRACT

A controller of a liquid ejection device obtains a temperature of a head after recording and before a pre-cap flushing and determines a pre-cap flushing voltage based on the temperature. Then, the controller outputs the pre-cap flushing voltage to the head in the pre-cap flushing process.

7 Claims, 12 Drawing Sheets

LIQUID EJECTION DEVICE, METHOD OF CONTROLLING LIQUID EJECTION DEVICE, AND NON-TRANSITORY COMPUTER-READABLE RECORDING MEDIUM THEREFOR

CROSS-REFERENCE TO RELATED APPLICATIONS

This application claims priority under 35 U.S.C. § 119 from Japanese Patent Application No. 2021-013140 filed on Jan. 29, 2021. The entire subject matter of the application is incorporated herein by reference.

BACKGROUND

The present disclosures relate to a liquid ejection device configured to execute a flushing process, a control method thereof, and a non-transitory computer-readable recording medium storing computer-executable instructions for controlling the liquid ejection device.

There has been known an inkjet printer in which a flushing process is performed immediately before recording an image on sheet (i.e., a recording process). The flushing process eliminates thickening of liquid (e.g., ink) in nozzles and prevents ejection defects during the recording process.

In the inkjet printer as described above, when printing of images on sheets (i.e., the recording process) is not performed, it is typical that the nozzles are covered with a cap member (i.e., a capping process).

SUMMARY

For example, in view of suppressing the thickening of the liquid in the nozzles during long-term capping, a flushing process (first flushing process) may be performed after a recording process and before the capping process. However, if the same voltage as that used during the recording process is applied to a recording head during the flushing process, an amount of ejected liquid may be insufficient to suppress thickening, or the amount of ejected liquid may be too large, resulting in excessive liquid consumption.

According to aspects of the present disclosure, a liquid ejection device, comprises a head having a plurality of nozzles, a cap, a moving mechanism configured to relatively move the head and the cap such that the cap is capable of selectively take a capping state and an uncapping state, the capping state being a state in which the cap contacts the head and covers the plurality of nozzles, the uncapping state being a state in which the cap is separated from the head and uncovers the plurality of nozzles, a conveyance mechanism configured to convey a recording medium relative to the head, and a controller. The controller can perform, when the cap is in the uncapping state, recording, based on image data, by controlling the conveyance mechanism to convey the recording medium and by outputting a voltage to the head to cause the plurality of nozzles to eject liquid toward the recording medium. Further, the controller can perform, when the cap is in the uncapping state, flushing, based on flushing data different from the image data, by outputting a voltage to the head to cause the plurality of nozzles to eject liquid, capping by driving the moving mechanism to move the cap such that the state of the cap is changed from the uncapping state to the capping state, first obtaining a temperature of the head after the recording and before a first flushing, the first flushing being the flushing performed after the recording and before the capping, first voltage determining a first flushing voltage based on the temperature obtained in the first obtaining, and outputting the first flushing voltage determined in the first voltage determining to the head when the first flushing is performed.

DETAILED DESCRIPTION OF THE EMBODIMENTS

First Embodiment

First, referring to FIGS. 1 to 3, an overall configuration of a printer 100 and a configuration of each component of the printer 100 will be described.

Figure 1:
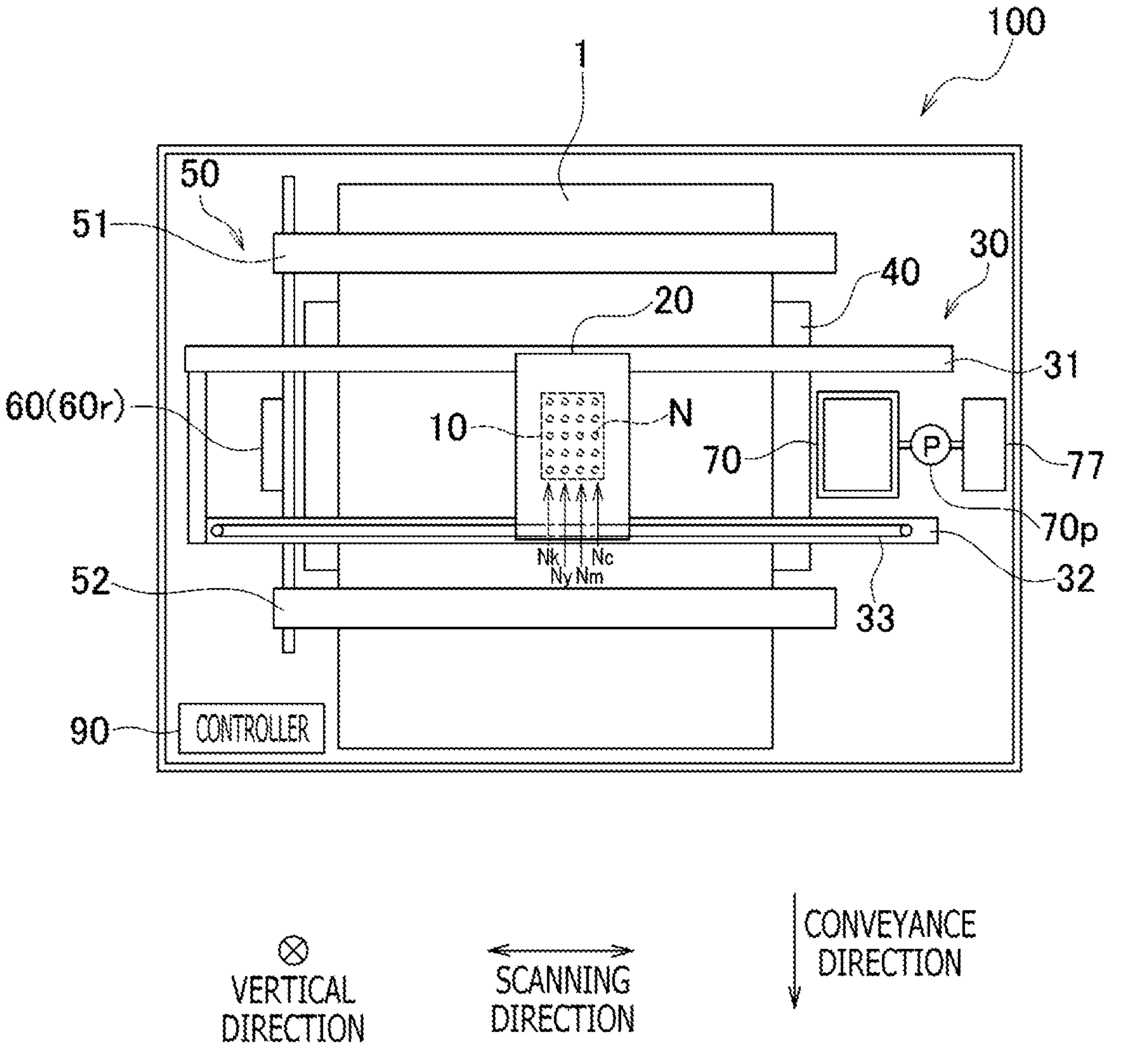
FIG. 1 is a plan view showing an overall configuration of a printer in a first embodiment of the present disclosures.

As shown in FIG. 1, the printer 100 according to the present embodiment has a head 10 having a plurality of nozzles N formed on a lower surface of the head 10, a carriage 20 configured to hold the head 10, a scanning mechanism 30 configured to move the carriage 20 and the head 10 in a scanning direction (i.e., in a direction orthogonal to a vertical direction), a platen 40, a conveyance mechanism 50 for conveying a sheet 1 in the conveyance direction (i.e., in a direction perpendicular to the scanning direction and the vertical direction), a flushing receiving member 60 arranged on one side of the scanning direction with respect to the platen 40, a cap 70 arranged on the other side of the scanning direction with respect to the platen 40, and a controller 90.

The nozzles N constitute four nozzle lines Nc, Nm, Ny, Nk arranged in the scanning direction. Each nozzle line Nc, Nm, Ny, Nk has a plurality of nozzles N aligned in the conveyance direction. The nozzles N constitute the nozzle line Nc configured to eject cyan ink, the nozzles N constitute the nozzle line Nm configured to eject magenta ink, the nozzles N constitute the nozzle line Ny eject yellow ink, and the nozzles N comprising the nozzle line Nk eject black ink.

The scanning mechanism 30 includes a pair of guides 31, 32 configured to support the carriage 20 and a belt 33 that is connected to the carriage 20. The guides 31, 32 and the belt 33 extend in the scanning direction. When a carriage motor 30*m* (see FIG. 3) is driven under the control of the controller 90, the belt 33 runs, and the carriage 20 and the head 10 move along the guides 31, 32 in the scanning direction.

The platen 40 is arranged below the head 10. The sheet 1 is supported on an upper surface of the platen 40.

The conveyance mechanism 50 has two roller pairs 51 and 52. The head 10 and the platen 40 are arranged between the roller pairs 51 and 52 in the conveyance direction. When the conveyance motor 50*m* (see FIG. 3) is driven under the control of the controller 90, the roller pairs 51, 52 rotate with the sheet 1 held therebetween, and the sheet 1 is conveyed in the conveyance direction. In this way, the conveyance mechanism 50 conveys the sheet 1 relative to the head 10.

The flushing receiving member 60 is arranged between the guides 31, 32 in the conveyance direction, and has a flushing area 60*r* on a surface thereof. The flushing area 60*r* is outside the conveyance area of the sheet 1 which is conveyed by the conveyance mechanism 50 and is defined adjacent to the conveyance area in the scanning direction. A pre-cap flushing process (i.e., a first flushing process) and an on-recording flushing process (i.e., a second flushing process) described below are performed on the flushing area 60*r*.

Figure 3:
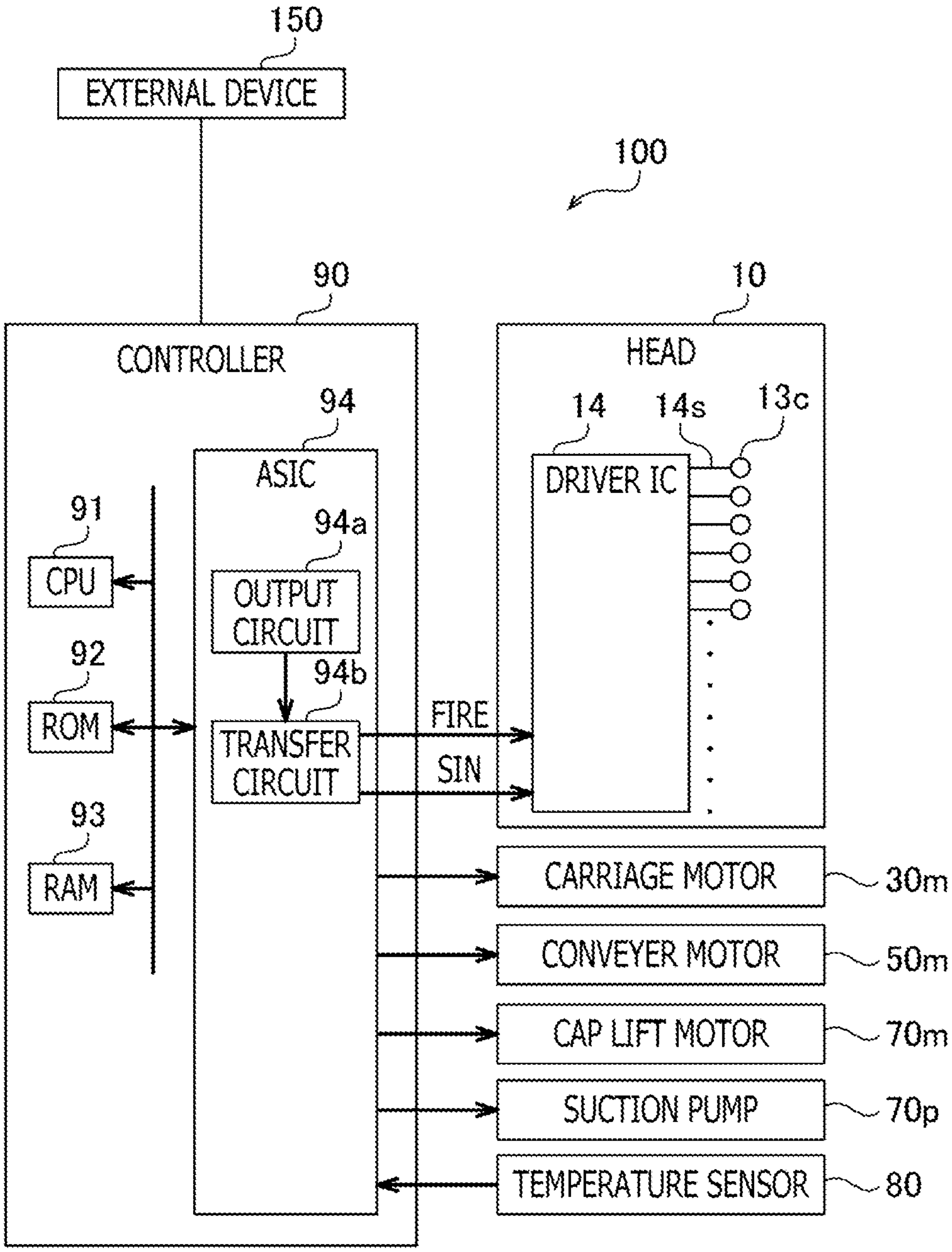
FIG. 3 is a block diagram of an electrical configuration of the printer shown in FIG. 1.

The cap 70 is a box-shaped member with an upper surface being opened and can be moved in a vertical direction by driving a cap lifting motor 70*m* (see FIG. 3). When the head 10 is located above the cap 70, the cap lifting motor 70*m* is driven under the control of the controller 90, and the cap 70 is moved upward so that the cap 70 contacts the lower surface of the head 10 to form a sealed space between the cap 70 and the head 10. At this time, all the nozzles N formed in the head 10 are covered by the cap 70. A state of the cap 70 at this time is referred to as a "capping state." On the other hand, a state in which the cap 70 is separated from the head 10 and does not cover the nozzles N (i.e., a state in which no sealed space is formed between the cap 70 and the head 10) is referred to as an "uncapping state."

It is noted that the scanning mechanism 30 (see FIG. 1) and the cap lifting motor 70*m* (see FIG. 3) move the head 10 and the cap 70 relative to each other so that the cap 70 can selectively take the capping state and the uncapping state, and constitute a "moving mechanism" according to aspects of the present disclosures.

The cap 70 is connected to a waste ink tank 77 via a tube and a suction pump 70*p*. When the cap 70 is in the capping state and the suction pump 70*p* is driven under the control of the controller 90, the sealed space between the cap 70 and the head 10 is depressurized and ink is forcibly discharged from the nozzle N. The ejected ink is received by the cap 70 and flows into the waste ink tank 77.

Figure 2:
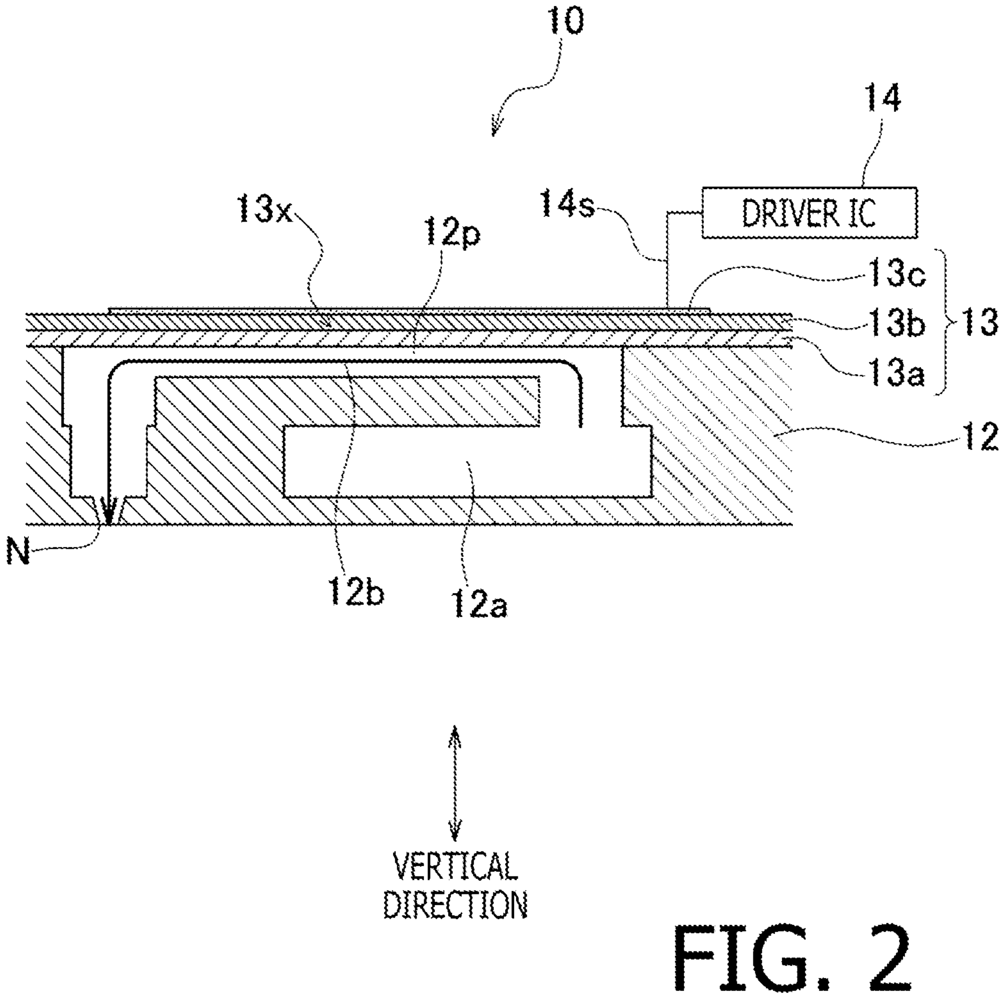
FIG. 2 is a cross-sectional view of a head shown in FIG. 1.

The head 10 includes a flow channel unit 12 and an actuator unit 13, as shown in FIG. 2.

A plurality of nozzles N (see FIG. 1) are formed on the lower surface of the channel unit 12. Inside the channel unit 12, a common channel 12*a* that connects to an ink tank (not shown) and an individual channel 12*b* for each nozzle N are formed. The individual channel 12*b* is a flow path from an outlet of the common channel 12*a* through the pressure chamber 12*p* to the nozzle N. A plurality of pressure chambers 12*p* are open on the top surface of the flow channel unit 12.

The actuator unit 13 includes a metal diaphragm 13*a* arranged on a top surface of the flow channel unit 12 to cover the plurality of pressure chambers 12*p*, a piezoelectric layer 13*b* arranged on the top surface of the diaphragm 13*a*, and a plurality of individual electrodes 13*c* arranged on the top surface of a piezoelectric layer 13*b* to face the plurality of pressure chambers 12*p*, respectively.

The diaphragm 13*a* and the plurality of individual electrodes 13*c* are electrically connected to a driver IC 14. The driver IC 14 maintains the potential of the diaphragm 13*a* at the ground potential, while changing the potential of the individual electrodes 13*c* between the ground potential and a drive potential. Concretely, the driver IC 14 generates a drive signal based on the control signal (i.e., a waveform signal FIRE and a selection signal SIN) from the controller 90, and supplies the drive signal to the individual electrodes 13*c* via a signal line 14*s*. With this configuration, the potential of individual electrode 13*c* is changed between the drive potential and the ground potential. Then, a portion of the diaphragm 13*a* and the piezoelectric layer 13*b* sandwiched between the individual electrodes 13*c* and the pressure chamber 12*p* (actuator 13*x*) deforms, thereby causing the volume of the pressure chamber 12*p* to change, applying pressure to the ink in the pressure chamber 12*p* and ejecting ink from the nozzle N. The actuator 13*x* is provided for each electrode 13*c* (i.e., for each nozzle N) and can be independently deformed according to the electric potential supplied to the individual electrode 13*c*.

As shown in FIG. 3, the controller 90 includes a CPU (Central Processing Unit) 91, a ROM (Read Only Memory) 92, a RAM (Random Access Memory) 93, and an ASIC (Application Specific Integrated Circuit) 94. Among them, the CPU 91 and ASIC 94 correspond to a "controller" according to aspects of the present disclosures.

The ROM 92 stores programs and data for the CPU 91 and the ASIC 94 to perform various controls, and the RAM 93 temporarily stores data (such as image data) for the CPU 91 and the ASIC 94 to use in executing the programs. The controller 90 is communicatively connected to an external device (such as a personal computer) 150, and the CPU 91 and the ASIC 94 perform the recording process, and the like, based on data input from the said external device 150 and the input part of the printer 100 (switches and buttons provided on the outer surface of the housing of the printer 100).

In the recording process, the ASIC 94, in accordance with commands (including image data) from the CPU 91, causes the conveyance mechanism 50 to perform a conveying operation and causes the head 10 to perform a scanning operation, alternately. The conveying operation and the scanning operation are performed by the ASIC 94 driving the driver IC 14, the carriage motor 30*m* and the conveyance motor 50*m*. The conveying operation is an operation of conveying the sheet 1 by a particular amount in the conveyance direction. The scanning operation is an operation in which the head 10 ejects ink from the nozzle N while moving in the scanning direction. As a result, ink dots are formed on the sheet 1, thereby an image being recorded.

While the recording process is being executed, the cap 70 is maintained in the uncapping state and the recording voltage V1 is output to the driver IC 14 of the head 10.

Figure 4A:
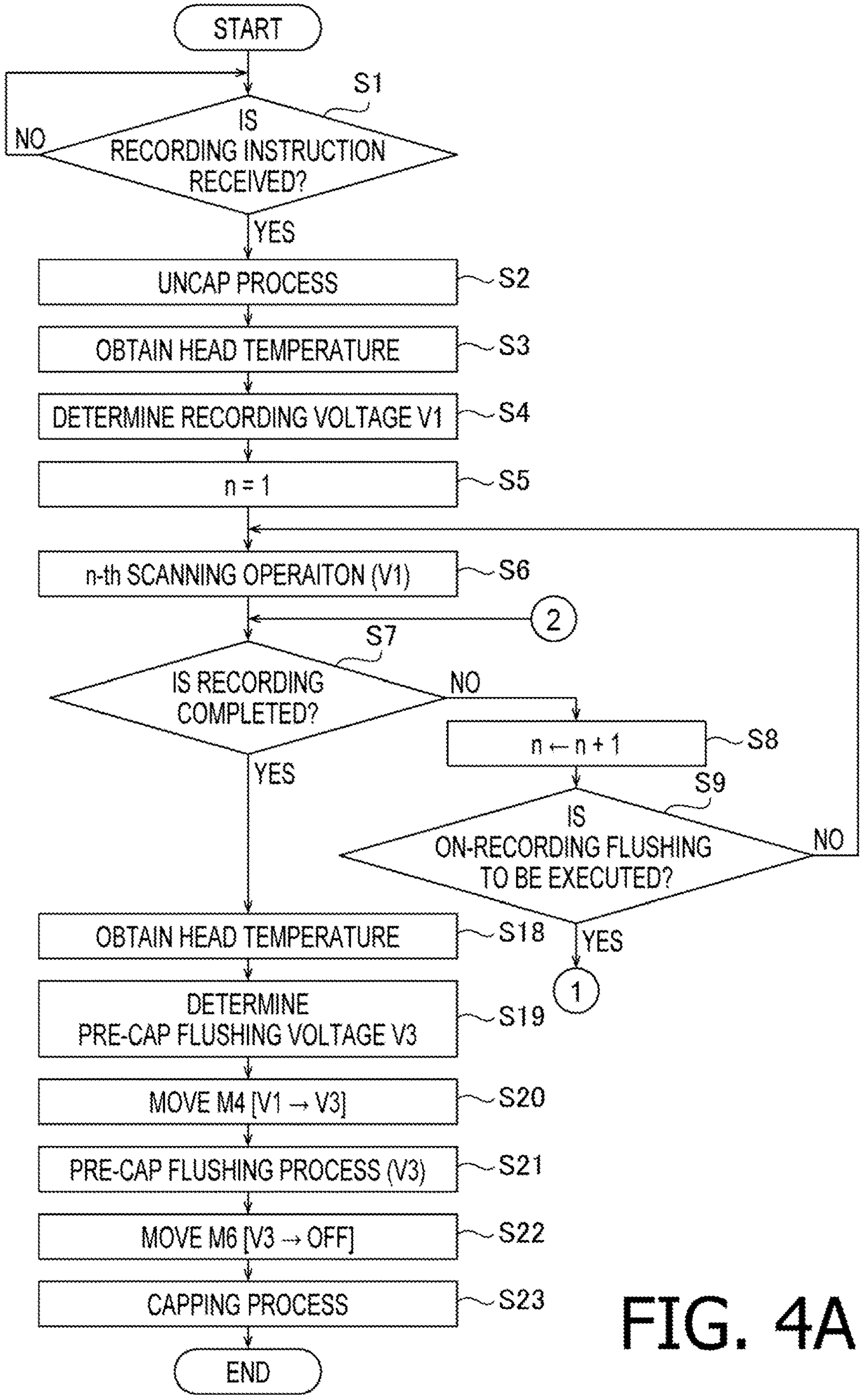
FIGS. 4A and 4B show a flowchart illustrating a program to be executed by a CPU of the printer shown in FIG. 1.
Figure 4B:
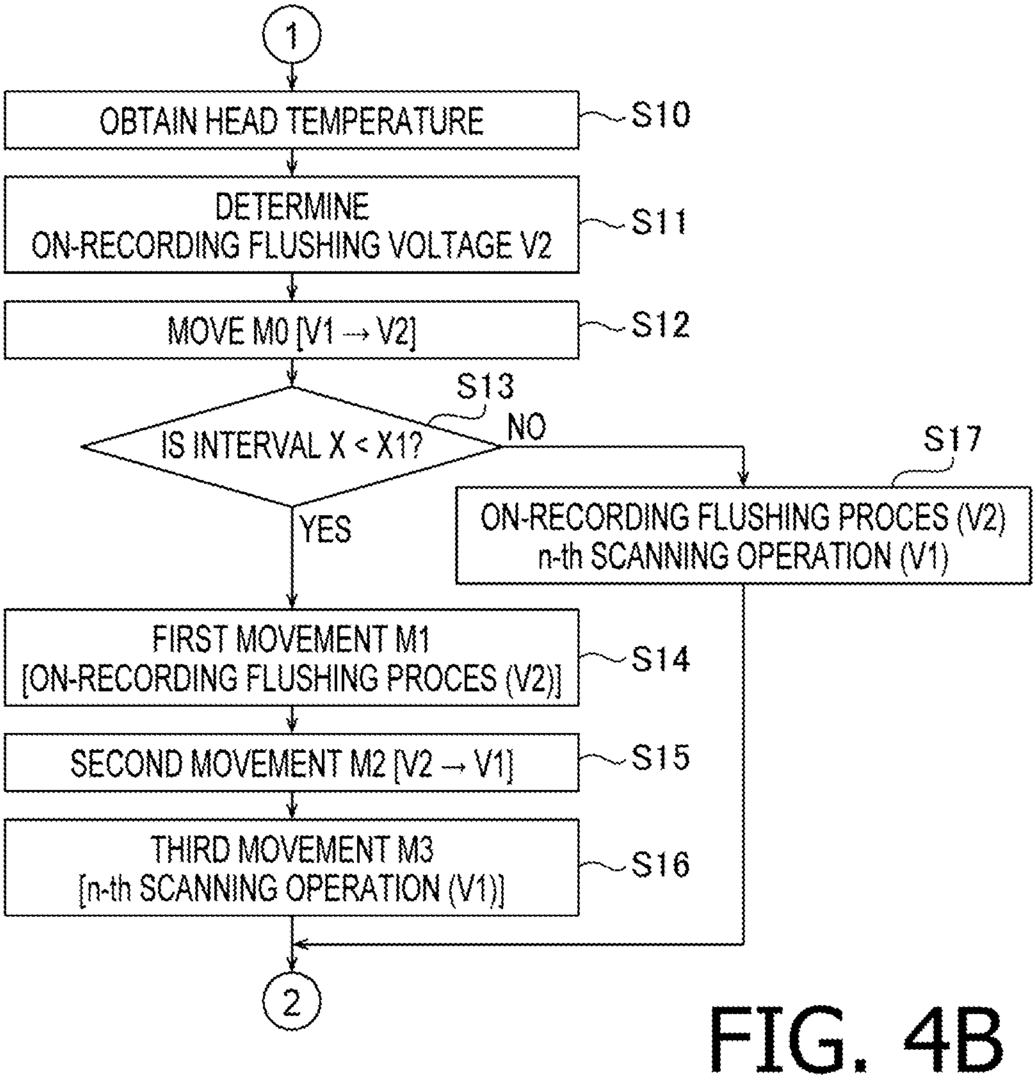
Figure 5:
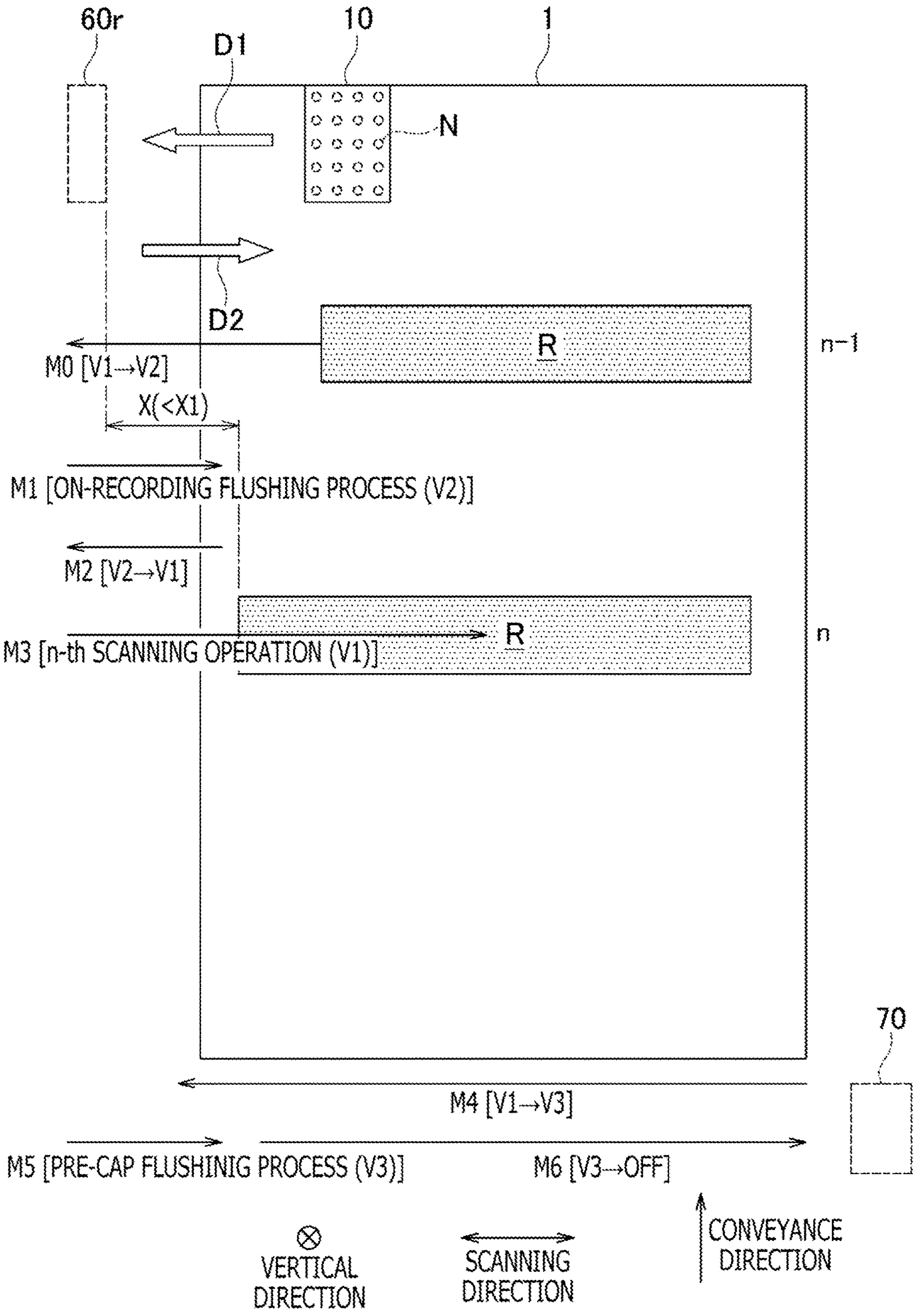
FIG. 5 schematically shows a relationship between a scanning operation and various flashing processes in a recording process according to the first embodiment of the present disclosures.

In addition to the recording voltage V1, flushing voltages V2 and V3 are output to the driver IC 14 according to the process (see FIGS. 4 and 5). In order to vary the voltage output to the driver IC 14, for example, the printer 100 has a plurality of power supply circuits of which output voltages differ from each other. The CPU 91 assigns power supply circuits respectively corresponding to the voltages V1 to V3 among the plurality of power supply circuits to the driver IC 14. The driver IC 14 generates drive signals by the voltage from the assigned power supply circuit.

The ASIC 94 includes an output circuit 94*a* and a transfer circuit 94*b*, as shown in FIG. 3.

The output circuit 94*a* generates the waveform signal FIRE and the selection signal SIN, and outputs these signals to the transfer circuit 94*b* at each recording cycle. The recording cycle is a time period required for the sheet 1 to move, relative to the head 10, by a unit distance corresponding to the resolution of the image formed on the sheet 1, which corresponds to one pixel.

The waveform signal FIRE is a serial signal serially arranged four waveform data, which respectively correspond to "zero (no ejection)," "small," "medium," and "large" ink droplets ejected from the nozzle N in one recording cycle. The number of pulses of the four waveform data are different from each other.

The selection signal SIN is a serial signal containing selection data for selecting one of the above four waveform data, and is generated, for each actuator 13*x* and for each recording cycle, based on the image data contained in the recording command.

The transfer circuit 94*b* transfers the waveform signal FIRE and the selection signal SIN received from the output circuit 94*a* to the driver IC 14. The transfer circuit 94*b* incorporates an LVDS (Low Voltage Differential Signaling) driver corresponding to each of the above signals, and transfers each signal to the driver IC 14 as a pulsed differential signal.

In the recording process, the ASIC 94 controls the driver IC 14 to generate a drive signal based on the waveform signal FIRE and the selection signal SIN for each pixel, and to supply the drive signal to the individual electrodes 13*c* via the signal line 14*s*. As a result, for each pixel, the ASIC 94 causes ink of a droplet amount selected from among four types of droplet amounts (zero, small, medium, and large) to be ejected from each of the plurality of nozzles N toward the sheet P.

The ASIC 94 is electrically connected to the temperature sensor 80 in addition to the driver IC 14, the carriage motor 30*m*, the conveyance motor 50*m*, the cap lifting motor 70*m* and the suction pump 70*p*. The temperature sensor 80 is configured to detect the temperature of the head 10 and outputs the data indicating the temperature to the ASIC 91.

Next, referring to FIGS. 4 and 5, the program executed by the CPU 91 will be described.

At the start of the program, the head 10 is located above the cap 70 (see FIG. 1) and the cap 70 is in the capping state. At this time, all the nozzles N formed in the head 10 are covered by the cap 70.

The CPU 91 first determines whether a recording command has been received from an external device 150 or the like as shown in FIG. 4 (S1). When the recording command has not been received (S1: NO), the CPU 91 repeats the process of S1.

When the recording command is received (S1: YES), the CPU 91 drives the cap lifting motor 70*m* to move the cap 70 downward, thereby shifting the state of the cap from the capping state to the uncapping state (S2).

After execution of S2, the CPU 91 obtains the temperature of the head 10 based on the data received from the temperature sensor 80 (S3: a third obtaining process).

After execution of S3, the CPU 91 determines the recording voltage V1 based on the temperature obtained in S3 (S4: the third determination process).

In S4, the CPU 91 extracts, for example, the recording voltage V1 corresponding to the temperature obtained in S3 from a table (i.e., a table showing the correspondence between the temperature of the head 10 and the voltage V1 for recording) stored in the ROM 92. Alternatively, the CPU 91 calculates the recording voltage V1 based on a calculation formula (i.e., a calculation formula for calculating the recording voltage V1 based on the temperature of the head 10) stored in the ROM 92 and the temperature obtained in S3. That is, "determining the recording voltage V1" means "extracting the recording voltage V1 from the table," "calculating the recording voltage V1 from the calculation formula," or the like.

After S4, the CPU 91 sets n to one (i.e., n=1) (S5).

After execution of S5, the CPU 91 causes the driver IC 14 to perform the n-th scanning operation while outputting the recording voltage V1 (S6).

The scanning operation includes a "forward scanning operation" in which ink is ejected from the nozzles N while the scanning mechanism 30 moves the head 10 in the direction D1 to one side (i.e., a left-hand side in FIG. 5) from the other side (i.e., a right-hand side in FIG. 5) of the scanning direction, and a "reverse scanning operation" in which ink is ejected from the nozzles N while the scanning mechanism 30 moves the head 10 in the direction D2 from the one side of the scanning direction (i.e., the left-hand side of FIG. 5) to the other side (i.e., the right-hand side of FIG. 5). The CPU 91 performs the forward scanning operation and the reverse scanning operation in the recording process. The n-th scanning operation of S6 is either the forward scanning operation or the reverse scanning operation. The n-th scanning operation of S6 is either a forward scanning operation or a reverse scanning operation. Whether each scanning operation is the forward scanning operation or the reverse scanning operation is determined, for example, based on an evaluation table stored in the ROM 92 (i.e., a table for suppressing color differences caused by differences in the order of ink overlap in the directions D1 and D2, in which a combination of pixel values (RGB values: gradation values from 0 to 255) and weight values are associated with each other).

The flushing area 60*r* is defined on one side of the scanning direction (i.e., the left-hand side in FIG. 5: direction D1) relative to the ejection area R where ink is ejected from the nozzles N in each scanning operation.

After S6, the CPU 91 determines whether the recording process based on the recording command received in S1 has been completed (S7).

When the recording process has not been completed (S7: NO), the CPU 91 sets n to (n+1) (S8).

After S8, the CPU 91 determines whether to execute the flushing process during recording (S9).

It is noted that the flushing process refers to a process of ejecting ink from the nozzles N based on flushing data which is different from the image data, and includes a "pre-cap flushing process (i.e., the first flushing process)" and an "on-recording flushing process (i.e., the second flushing process)".

The pre-cap flushing process is performed after the recording process based on the recording command received in S1 (S7: YES) and before the capping process (S23).

The on-recording flushing process is performed during the recording process for one sheet 1, and is performed between successive scanning operations. For example, as shown in FIG. 5, when the flushing process is performed between the (n−1)-th and the n-th scanning operations included in the recording process for one sheet 1, the (n−1)-th scanning operation corresponds to a "first recording process" according to aspects of the present disclosures, while, the n-th scanning operation corresponds to a "second recording process" according to aspects of the present disclosures. In this embodiment, when the (n−1)-th scanning operation is the forward scanning operation and the n-th scanning operation is the reverse scanning operation, and when a particular condition (such as a condition regarding an elapsed time since the previous flushing process) is satisfied, it is determined that the on-recording flushing process is to be performed (S9: YES).

While each flushing process is executed, the cap 70 is maintained in the uncapping state. While the on-recording flushing process is being executed, the on-recording flushing voltage V2 (i.e., the second flushing voltage) is output to the driver IC 14, and while the pre-cap flushing process is being executed, the pre-cap flushing voltage V3 (i.e., the first flushing voltage) is output to the driver IC 14.

In the present embodiment, each flushing process is performed while the head 10 moves in the direction D2 (without stopping the head 10). Concretely, while the head 10 moves in the direction D2, the CPU 91 deforms the actuator 13*x* by driving the driver IC 14 based on the flushing data at the timing when the nozzle line in question overlaps the flushing area 60*r* in the vertical direction, for each of the nozzle lines Nc, Nm, Ny, and Nk, thereby ink being ejected from the nozzles N belonging to the nozzle line in question. The ink is ejected from the nozzles N belonging to the nozzle line. The ejected ink is received by the flushing area 60*r* and flows to the waste ink tank 77 (see FIG. 1).

When the on-recording flushing process is not executed (S9: NO), the CPU 91 returns the process to S6.

When the on-recording flushing process is executed (S9: YES), the CPU 91 obtains the temperature of the head 10 based on the data received from the temperature sensor 80 (S10: the second acquisition process).

After execution of S10, the CPU 91 determines the on-recording flushing voltage V2 based on the temperature obtained in S10 (S11: the second determination process).

In S11, the CPU 91 extracts the on-recording flushing voltage V2 corresponding to the temperature obtained in S10 from, for example, a table (i.e., a table showing the correspondence between the temperature of the head 10 and the on-recording flushing voltage V2) stored in the ROM 92. Alternatively, the CPU 91 calculates the on-recording flushing voltage V2 from a calculation formula (i.e., a calculation formula for calculating the on-recording flushing voltage V2 from the temperature of the head 10) stored in the ROM 92 and the temperature obtained in S10. In other words, "determining the on-recording flushing voltage V2" means extracting the on-recording flushing voltage V2 from the table, calculating the on-recording flushing voltage V2 from the calculation formula, or the like.

After execution of S11, the CPU 91 changes the voltage to be output to the driver IC 14 from the recording voltage V1 to the on-recording flushing voltage V2 during a movement M0 of the head 10 as shown in FIG. 5 (S12). It is noted that the movement M0 refers to the movement of the head 10 further in the direction D1 from the relevant ejection area R to the flushing area 60*r* by the scanning mechanism 30 after the completion of the (n−1)-th scanning operation (i.e., discharging to the relevant ejection area R).

After execution of S12, the CPU 91 determines whether an interval X, in the scanning direction, between the flushing area 60*r* and the dispensing area R of the n-th scanning operation is less than a first particular interval X1 (S13: a first determination process).

When the interval X is less than the first particular interval X1 (S13: YES), the CPU 91 drives the scanning mechanism 30 to move the head 10 in the direction D2 (S14: first movement M1) as shown in FIG. 5. During the first movement M1, the CPU 91 outputs the on-recording flushing voltage V2 to the driver IC 14 and executes the on-recording flushing process.

After execution of S14, the CPU 91 drives the scanning mechanism 30 to move the head 10 in the direction D1 as shown in FIG. 5 (S15: second movement M2). The CPU 91 changes the voltage output to the driver IC 14 from the on-recording flushing voltage V2 to the recording voltage V1 for recording during the second movement M2.

After execution of S15, the CPU 91 drives the scanning mechanism 30 to move the head 10 in the direction D2 as shown in FIG. 5 (S16: third movement M3). The CPU 91 executes the n-th scanning operation while outputting the recording voltage V1 to the driver IC 14 during the third movement M3.

An end point of the movement M0 of the head 10, a start point of the first movement M1, an end point of the second movement M2, and a start point of the third movement M3 are the positions that overlap, in the vertical direction, with the flushing area 60*r*. The end point of the first movement M1 and the start point of the second movement M2 are positions that overlap, in the vertical direction, with the vicinity of one end (left end in FIG. 5), in the scanning direction, of the ejection area R of the n-th scanning operation.

When the interval X is not less than the first particular interval X1 (S13: NO), the CPU 91 drives the scanning mechanism 30 and moves the head 10 in the direction D2 in the same manner as the third movement M3 shown in FIG. 5. While the head 10 is moving, the CPU 91 outputs the on-recording flushing voltage V2 to the driver IC 14 and executes the on-recording flushing process, and then, while continuing the movement of the head 10 (without stopping the head 10), changes the voltage output to the driver IC 14 from the on-recording flushing voltage V2 to the recording voltage V1, and executes the n-th scanning operation while outputting the recording voltage V1 to the driver IC 14 (S17).

After execution of S16 or S17, the CPU 91 returns the process to S7.

When the recording process is completed (S7: YES), the CPU 91 obtains the temperature of the head 10 based on the data received from the temperature sensor 80 (S18: the first obtaining process).

After execution of S18, the CPU 91 determines the voltage V3 for the pre-cap flushing based on the temperature obtained in S18 (S19: the first determination process).

In S19, the CPU 91 extracts, for example, the pre-cap flushing voltage V3 corresponding to the temperature obtained in S18 from a table (i.e., a table showing the correspondence relationship between the temperature of the head 10 and the pre-cap flushing voltage V3) stored in the ROM 92. Alternatively, the CPU 91 calculates the pre-cap flushing voltage V3 from the calculation formula (i.e., a calculation formula for calculating the pre-cap flushing voltage V3 from the temperature of the head 10) stored in the ROM 92 and the temperature obtained in S18. In other words, "determining the pre-cap flushing voltage V3" means extracting the pre-cap flushing voltage V3 from the table, calculating the pre-cap flushing voltage V3 from the calculation formula, or the like.

After execution of S19, the CPU 91 drives the scanning mechanism 30 to change the voltage output to the driver IC 14 from the recording voltage V1 to the pre-cap flushing voltage V3 while moving the head 10 in the direction D1 (i.e., during the movement M4) as shown in FIG. 5 (S20).

After execution of S20, the CPU 91 executes the pre-cap flushing process while outputting the pre-cap flushing voltage V3 to the driver IC 14 while moving the head 10 in the direction D2 (i.e., during the movement M5) (S21).

After S21, the CPU 91 changes the voltage output to the driver IC 14 from the pre-cap flushing voltage V3 to zero (OFF) during a movement M6 of the head 10, as shown in FIG. 5 (S22). The movement M6 refers to the movement of the head 10 in the further direction D2 following the movement M5 in which the pre-cap flushing process is executed (without stopping the head 10).

After execution of S22, the CPU 91 stops the head 10 when the head 10 is located above the cap 70 by the movement M6, and after the head 10 is stopped, the cap lifting motor 70*m* is driven to move the cap 70 upward to shift the cap 70 from the uncapping state to the capping state (S23: capping process).

After execution of S23, the CPU 91 terminates the program.

As described above, according to the present embodiment, after the recording process (S7: YES) and before the pre-cap flushing process (S21), the CPU 91 obtains the temperature of the head (S18) and determines the pre-cap flushing voltage V3 based on the temperature obtained in S18 (S19). Then, in the pre-cap flushing process (S21), the CPU 91 outputs the pre-cap flushing voltage V3 determined in S19 to the driver IC 14. When the recording voltage V1 (i.e., a voltage based on the temperature of the head 10 immediately before the start of the recording process) is output to the driver IC 14 in the pre-cap flushing process (S21), the temperature of the head 10 at the time when the pre-cap flushing process (S21) is executed and that at the time immediately before the start of the recording process (S3) become different from each other, there may occur problems, such as insufficient ink ejection amount, resulting in insufficient thickening suppression effect, or too much ink ejection amount, resulting in excessive ink consumption. In the present embodiment, the temperature of the head is obtained (S18) after the recording process (S7: YES) and before the pre-cap flushing process (S21), and the pre-cap flushing process (S21) is executed by outputting the pre-cap flushing voltage V3 based on the temperature to the driver IC 14. By doing so, the pre-cap flushing process can be executed with an appropriate ink ejection amount.

In the case where the on-recording flushing process is executed between the (n−1)-th scanning operation and the n-th scanning operation, the CPU 91 obtains the temperature of the head (S10) after the (n−1)-th scanning operation and before the on-recording flushing process (S14), and determines the on-recording flushing voltage V2 based on the temperature acquired in S10 (S11). The CPU 91 determines the on-recording flushing voltage V2 (S11) based on the temperature obtained in S10. Then, in the on-recording flushing process (S14), the CPU 91 outputs the on-recording flushing voltage V2 determined in S11 to the driver IC 14. This enables the flushing process (S14) during recording to be executed with an appropriate ejection amount.

After the (n−1)-th scanning operation and before the on-recording flushing process (S14), the CPU 91 changes the voltage output to the driver IC 14 from the recording voltage V1 to the on-recording flushing voltage V2 while the head 10 is being moved by the scanning mechanism 30 (i.e., during the movement M0 of the head 10) (S12). In this case, a high-speed recording can be achieved compared to the case where the head 10 is stopped once and the voltage is changed while the head 10 is stopped.

After the flushing during recording process (S14) and before the n-th scanning operation, the CPU 91 changes the voltage output to the driver IC 14 from the on-recording flushing voltage V2 to the recording voltage V1 while the head 10 is being moved by the scanning mechanism 30 (i.e., during the second movement M2) (S15). When the voltage output to the driver IC 14 is not changed after the on-recording flushing process (S14) and before the n-th scanning operation, the voltages output to the driver IC 14 are different between the (n−1)-th and n-th scanning operations. In such a case, the amounts of the ink droplets ejected by the same drive signal become different, which results in density difference in the images. In contrast, in the present embodiment, after the flushing process (S14) during recording and before the n-th scanning operation, the voltage output to the driver IC 14 is returned to the recording voltage V1, thereby suppressing the above-mentioned problem of density difference. Also, in the present embodiment, by changing the voltage while the head 10 is moving, the high-speed recording can be achieved compared to the case where the head 10 is stopped once and the voltage is changed while the head 10 is stopped.

When the interval X, in the scanning direction, between the flushing area 60*r* and the dispensing area R of the n-th scanning operation is less than the first particular interval X1 (S13: YES), the CPU 91 moves the head 10 in the direction D2 (S14: a first movement M1), as shown in FIG. 5, and then moves the head 10 in the direction D1 (S15: a second movement M2), and after that, moves the head 10 in the direction D2 (S16: a third movement M3). The CPU 91 then executes the on-recording flushing process during the first movement M1 (S14). In this case, the time for the recording process can be shortened compared to the case where the head 10 is stopped once and the on-recording flushing process is executed while the head 10 is stopped. Further, by executing the second movement M2 after the on-recording flushing process (S14) and before the n-th scanning operation, more time becomes available and the voltage output to the driver IC 14 can be changed from the on-recording flushing voltage V2 to the recording voltage V1 without fail.

Second Embodiment

Figure 6A:
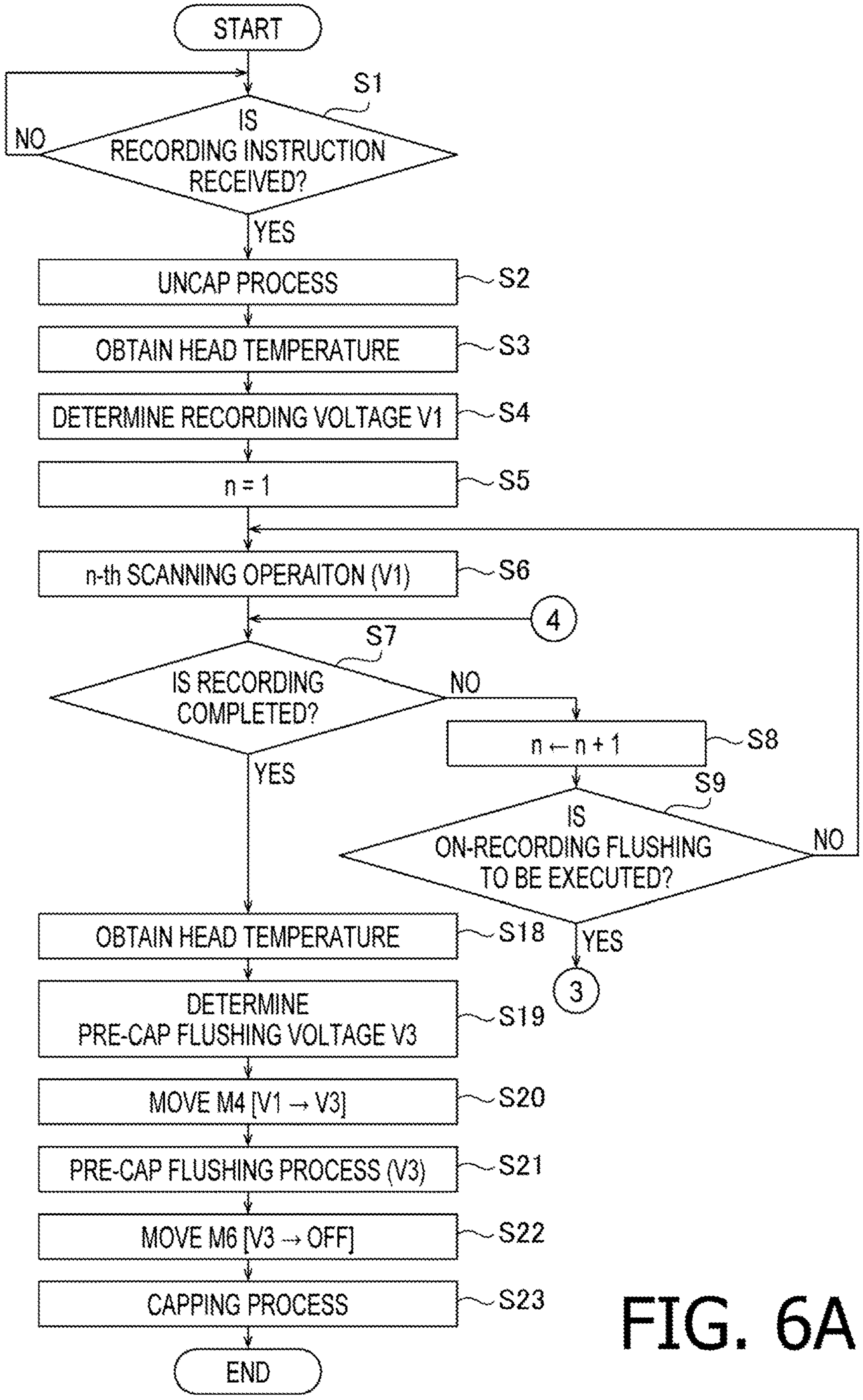
FIGS. 6A and 6B are a flowchart illustrating a program executed by the CPU of the printer according to a second embodiment of the present disclosures.
Figure 6B:
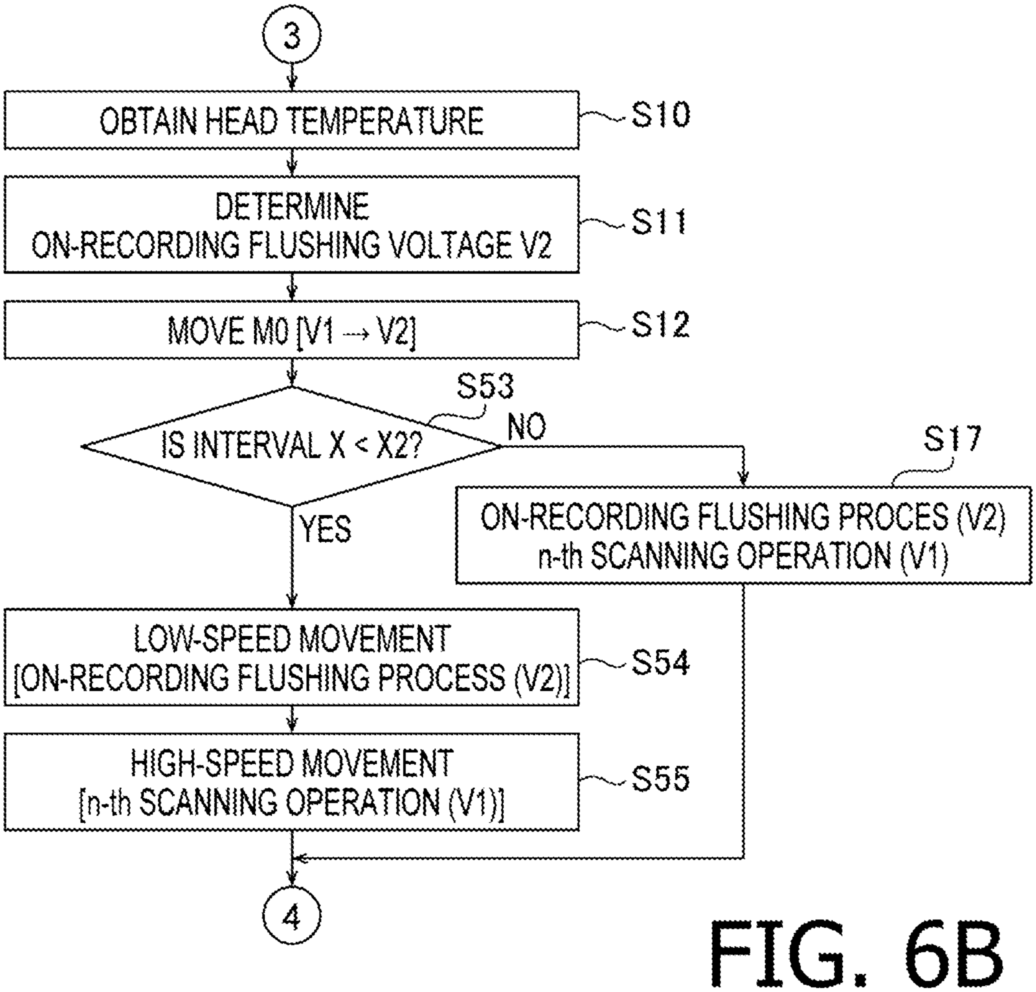
Figure 7:
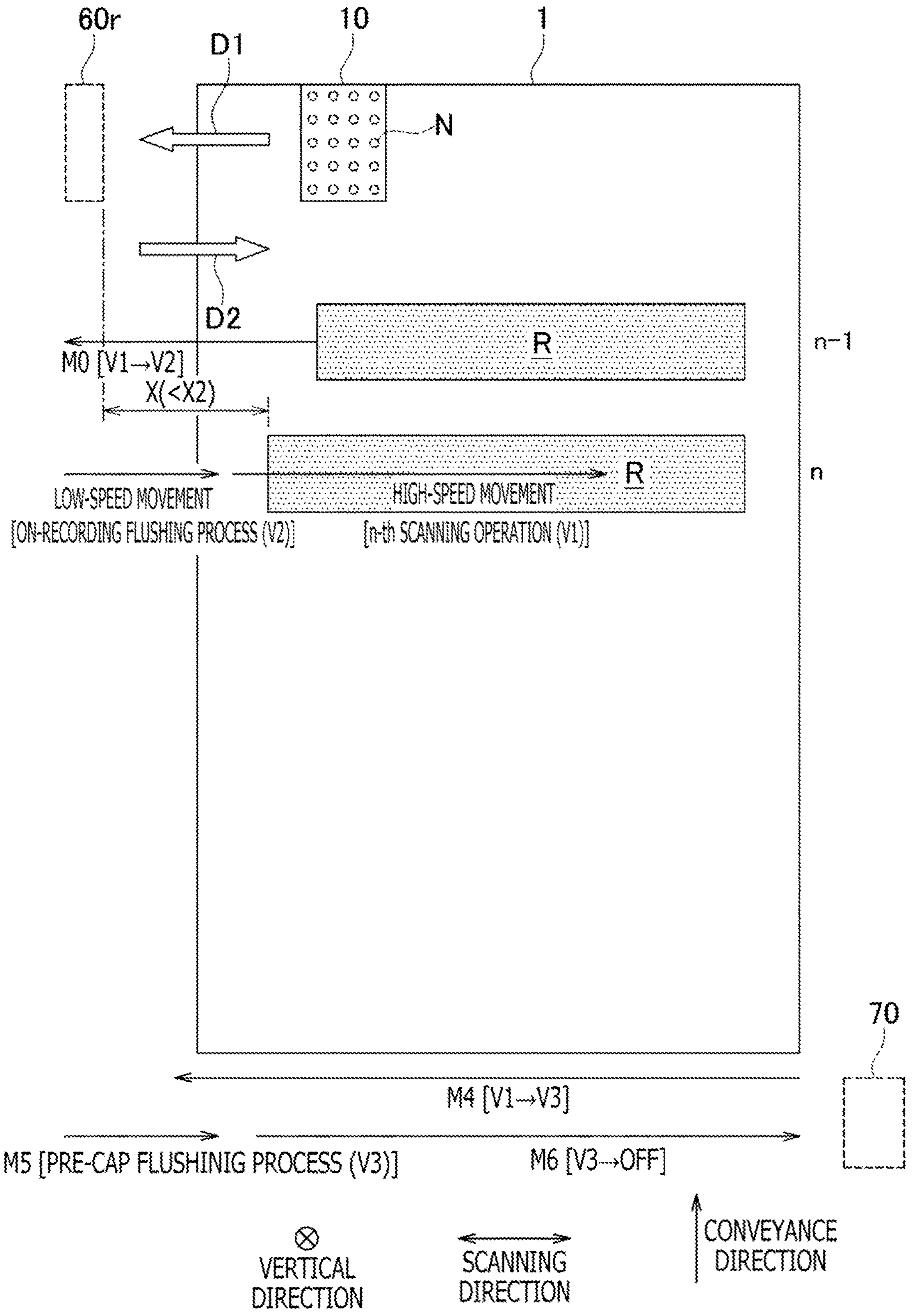
FIG. 7 schematically shows a relationship between a scanning operation and various flushing processes in a recording process according to the second embodiment of the present disclosures.

Then, referring to FIG. 6 and FIG. 7, a printer according to the second embodiment will be described.

In the first embodiment (see FIGS. 4 and 5), the CPU 91 determines whether the interval X is less than the first particular interval X1 (S13), and when the interval X is less than the first particular interval X1 (S13: YES), the CPU 91 causes the scanning mechanism 30 to sequentially perform the first movement M1 in the direction D2, the second movement M2 in the direction D1, and the third movement M3 in the direction D2. In the second embodiment (see FIGS. 6 and 7), it is determined whether the interval X is less than a second particular interval X2 (S53), and when the interval X is less than the second particular interval X2 (S53: YES), low-speed movement (S54) and high-speed movement (S55) in the direction D2 are performed sequentially by the scanning mechanism 30.

It is noted that the second particular interval X2 is larger than the first particular interval X1 (X2>X1). For example, the second particular interval X2 may be 10-15 mm, while the first particular interval X1 may be about 5 mm.

After execution of S12, the CPU 91 determines whether the interval X is less than the second particular interval X2 (S53: a second determination process).

When the interval X is less than the second particular interval X2 (S53: YES), the CPU 91 drives the scanning mechanism 30 to move the head 10 in the direction D2 as shown in FIG. 7. At this time, the CPU 91 controls the carriage motor 30*m* (see FIG. 3) to cause the scanning mechanism 30 to perform the low-speed movement (S54) and the high-speed movement (S55).

The low-speed movement (S54) refers to an operation to move the head 10 in the direction D2 at a first speed, starting at the position where the head 10 overlaps the flushing area 60*r* in the vertical direction. The high-speed movement (S55) refers to an operation to move the head 10 in the direction D2 at a second speed (>the first speed) following the low-speed movement (S54) without stopping the head 10.

The CPU 91 executes the on-recording flushing process while outputting the on-recording flushing voltage V2 to the driver IC 14 during the low-speed movement (S54). The CPU 91 executes the n-th scanning operation while outputting the recording voltage V1 to the driver IC 14 during the high-speed movement (S55). At the end of low-speed movement (S54), at the start of high-speed movement (S55), and the like, the CPU 91 changes the voltage output to the driver IC 14 from the on-recording flushing voltage V2 to the recording voltage V1.

As described above, the present embodiment provides following effects in addition to the same effects based on the same configuration as the first embodiment.

When the interval X is less than the second particular interval X2 (S53: YES), the CPU 91 causes the scanning mechanism 30 to execute the low-speed movement (S54) and the high-speed movement when moving the head 10 in the direction D2, and executes the on-recording flushing process during the low-speed movement (S54), as shown in FIG. 7. In this case, the time for the recording process can be shortened compared to the case where the head 10 is stopped once and the on-recording flushing process is executed while the head 10 is stopped. In addition, when the on-recording flushing process is executed during the high-speed movement (S55), a negative pressure may be generated due to a dynamic pressure in the head 10, which may result in insufficient ink ejection amount and insufficient thickening suppression effect. In this regard, according to the present embodiment, by executing the on-recording flushing process during the low-speed movement (S54), the above problem caused by the dynamic pressure in the head 10 can be suppressed.

Third Embodiment

Figure 8A:
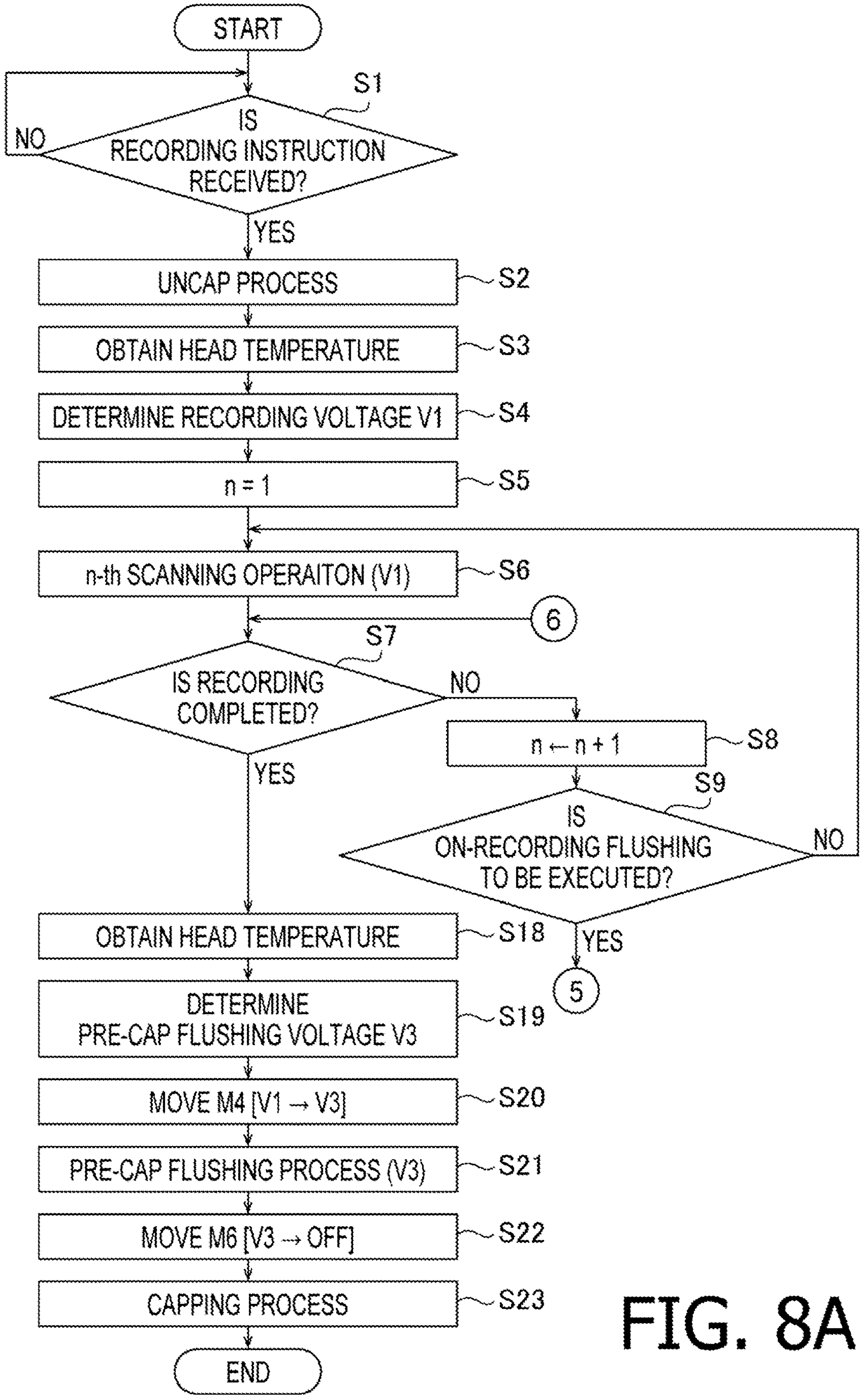
FIGS. 8A and 8B are a flowchart illustrating a program executed by the CPU of the printer according to a third embodiment of the present disclosures.
Figure 8B:
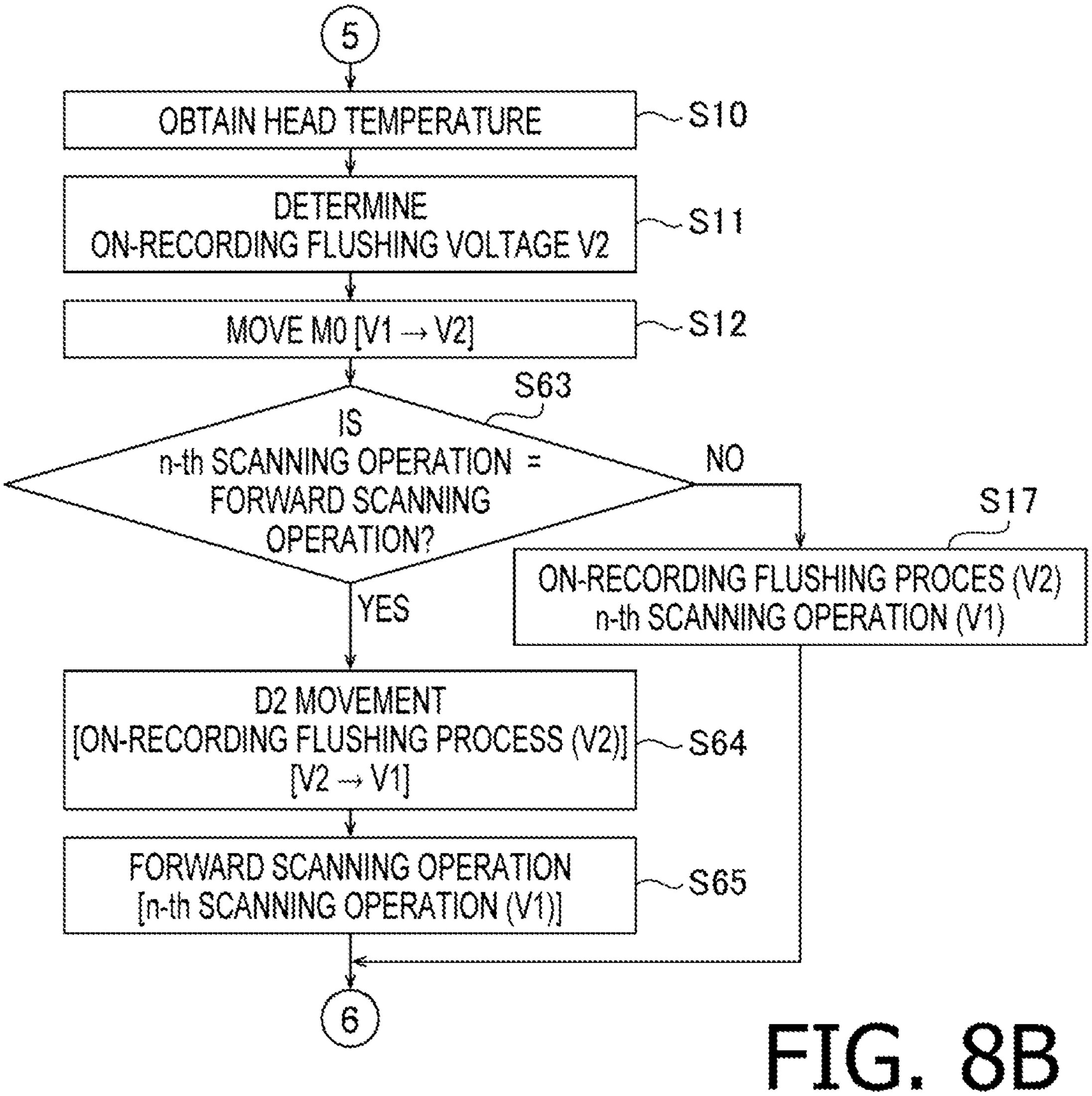
Figure 9:
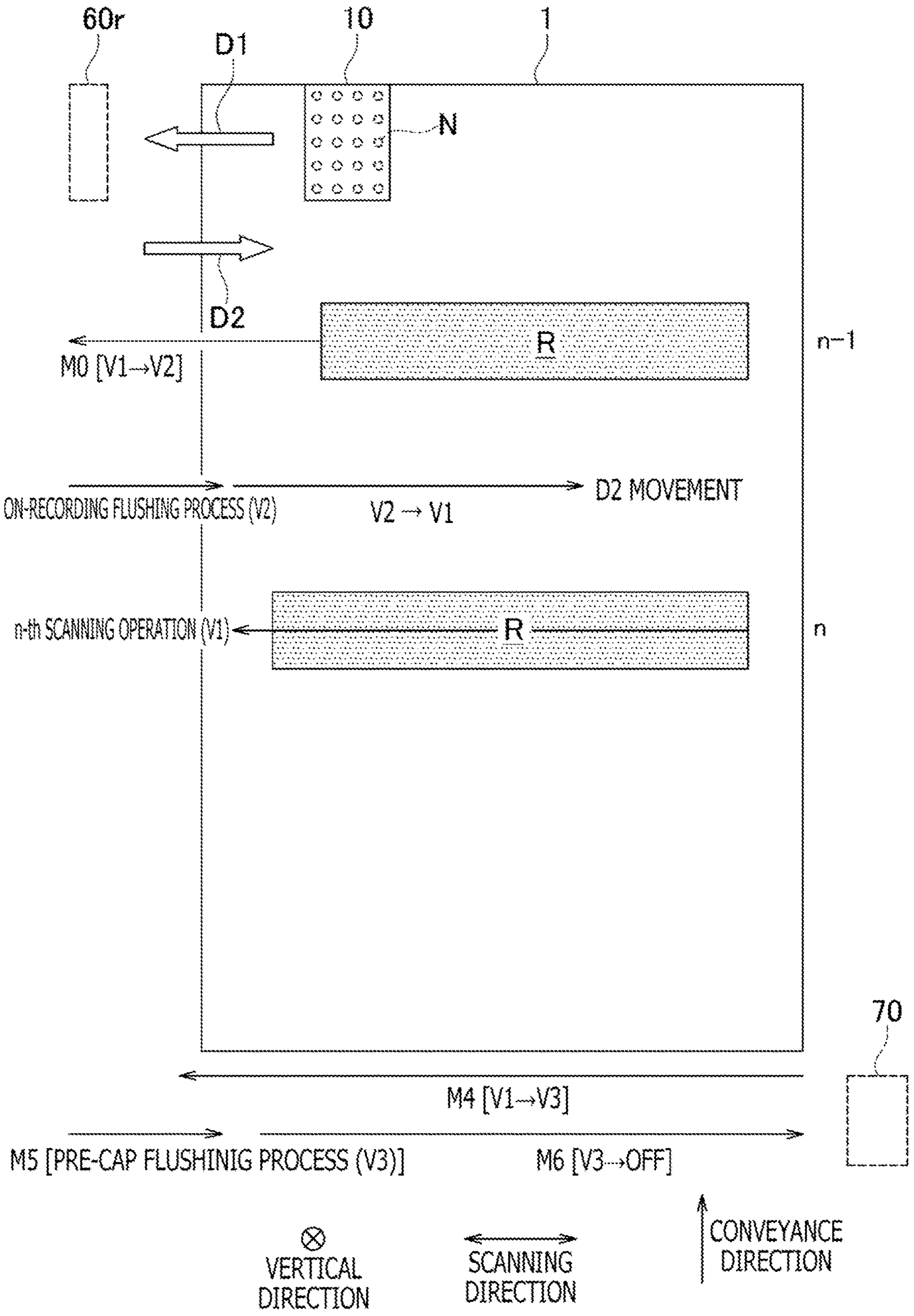
FIG. 9 schematically shows a relationship between a scanning operation and various flushing processes in a recording process according to the third embodiment of the present disclosures.

Next, referring to FIGS. 8 and 9, a printer according to a third embodiment of the present disclosures will be described.

In the first embodiment (see FIGS. 4 and 5), the CPU 91 determines whether the interval X is less than the first particular interval X1 (S13), and when the interval X is less than the first particular interval X1 (S13: YES), the CPU 91 causes the scanning mechanism 30 to perform the first movement M1 in the direction D2, the second movement M2 in the direction D1, and the third movement M3 in the direction D2 sequentially. In the third embodiment (see FIG. 8 and FIG. 9), the CPU 91 initially determines whether the n-th scanning operation is the forward scanning operation or not (S63). When the n-th scanning operation is the forward scanning operation (S63: YES), while the head 10 is moved, in the direction D2, between the (n−1)-th scanning operation and the n-th scanning operation, the on-recording flushing process and the voltage change (from V2 to V1) are executed (S64), and then the head 10 is moved in the direction D1, and the n-th scanning operation (i.e., the forward scanning operation) is executed (S65).

After execution of S12, the CPU 91 determines whether the n-th scanning operation is the forward scanning operation (S63: the third determination process). In this embodiment, when the n−1 scanning operation is the forward scanning operation and a particular condition (such as the elapsed time since the previous flushing process) is satisfied, it is determined that the on-recording flushing process is to be executed (S9: YES). Therefore, S63 is a process to determine whether the (n−1)-th scanning operation (i.e., a preceding scanning operation) and the n-th scanning operation (i.e., a succeeding scanning operation) are both positive scanning operations.

When the n-th scanning operation is the forward scanning operation (i.e., the (n−1)-th scanning operation and the n-th scanning operation are both forward scanning operations) (S63: YES), the CPU 91 executes the on-recording flushing process while outputting the on-recording flushing voltage V2 to the driver IC 14 between the (n−1)-th scanning operation and the n-th scanning operation and while the scanning mechanism 30 moves the head 10 in the direction D2 (hereinafter, referred to as a during D2 movement). After the flushing process, while continuing the D2 movement without stopping the head 10, the voltage output to the driver IC 14 is changed from the on-recording flushing voltage to the on-recording flushing voltage. After the flushing process, while continuing the D2 movement (without stopping the head 10), the voltage output to the driver IC 14 is changed from the flushing voltage V2 to the recording voltage V1 (S64).

After execution of S64, the CPU 91 moves the head 10 in the direction D1 by controlling the scanning mechanism 30 and executes the n-th scanning operation (i.e., the forward scanning operation) while outputting the recording voltage V1 to the driver IC 14 (S65).

As described above, the present embodiment provides following effects in addition to the same effects based on the same configuration as the first embodiment.

When both the (n−1)-th scanning operation and the n-th scanning operation are positive scanning operations (S63: YES), the CPU 91 executes the on-recording flushing process and the voltage change (from V2 to V1) between the (n−1)-th scanning operation and the n-th scanning operation and while the scanning mechanism 30 moves the head 10 in the direction D2 (during D2 movement). In this case, the voltage can be changed reliably by using the movement time of the head 10 between the (n−1)-th scanning operation and the n-th scanning operation.

Modifications

Suitable embodiments according to aspects of the present disclosures have been described. It is noted, however, the present disclosures are not necessarily limited to the above-described embodiments, but various design changes can be made without departing from aspects of the present disclosures.

The heads in the above-described embodiments are equipped with nozzles that eject different types of liquids (e.g., inks of different colors), but the configuration is not necessarily limited to this configuration. For example, the head may be equipped with nozzles that eject the same type of liquid (e.g., only the ink of the same color).

The flushing process is not necessarily limited to one performed while the head is moving, but may also be one performed while the head is stopped.

Changing of the voltage is not necessarily performed while the head is moving, but you can also be performed while the head is stopped.

The head is a serial type in the embodiments described above, but it can also be a linear type.

The liquid ejected from the nozzle is not limited to ink, but may be any liquid other than ink (e.g., a processing liquid that coagulates or precipitates the components in ink).

The recording medium is not limited to paper, but can also be cloth, resin material, and the like.

The present disclosures is not limited to printers, but is also applicable to facsimiles, copiers, multifunction peripherals, and the like. Aspects of the present disclosures are also applicable to liquid ejection devices used for applications other than recording images (e.g., liquid ejection devices that form conductive patterns by dispensing conductive liquids on a substrate).

The program according to aspects of the present disclosures can be distributed by recording the same on removable recording media such as flexible disks or fixed recording media such as hard disks, or via communication lines.

What is claimed is:

1. A liquid ejection device, comprising:

a head having a plurality of nozzles;

a cap;

a moving mechanism configured to relatively move the head and the cap such that the cap is capable of selectively taking a capping state and an uncapping state, the capping state being a state in which the cap contacts the head and covers the plurality of nozzles, the uncapping state being a state in which the cap is separated from the head and uncovers the plurality of nozzles;

a conveyance mechanism configured to convey a recording medium relative to the head; and a controller, wherein the controller is configured to perform:

when the cap is in the uncapping state, recording, based on image data, by controlling the conveyance mechanism to convey the recording medium and by outputting a voltage to the head to cause the plurality of nozzles to eject liquid toward the recording medium;

when the cap is in the uncapping state, flushing, based on flushing data different from the image data, by outputting a voltage to the head to cause the plurality of nozzles to eject liquid;

capping by driving the moving mechanism to move the cap such that the state of the cap is changed from the uncapping state to the capping state;

first obtaining a temperature of the head after the recording and before a first flushing, the first flushing being the flushing performed after the recording and before the capping;

first voltage determining a first flushing voltage based on the temperature obtained in the first obtaining; and outputting the first flushing voltage determined in the first voltage determining to the head when the first flushing is performed.

2. The liquid ejection device according to claim 1, wherein, when the recording for one recording medium includes a first recording and a second recording and the flushing includes second flushing to be performed between the first recording and the second recording, the controller is configured to perform:

second obtaining the temperature of the head after the first recording and before the second flushing;

second voltage determining a second flushing voltage based on the temperature obtained in the second obtaining; and outputting the second flushing voltage determined in the second voltage determining to the head when the second flushing is performed.

3. The liquid ejection device according to claim 2, further comprising a scanning mechanism configured to move the head in a scanning direction, the scanning mechanism being included in the moving mechanism, wherein the controller is configured to perform:

third obtaining the temperature of the head before the first recording;

third voltage determining a recording voltage based on the temperature obtained in the third obtaining;

outputting the recording voltage determined in the third voltage determining when the first recording and the second recording are performed; and changing a voltage output to the head from the recording voltage to the second flushing voltage while the head is moved by the scanning mechanism after the first recording and before the second flushing.

4. The liquid ejection device according to claim 3, wherein the controller is configured to change the voltage output to the head from the second flushing voltage to the recording voltage while the head is moved by the scanning mechanism after the second flushing and before the second recording.

5. The liquid ejection device according to claim 3, wherein a flushing area, toward which the liquid is ejected from the plurality of nozzles in the second flushing, is located on one side in the scanning direction with respect to an ejection area toward which the liquid is ejected from the plurality of nozzles in the second recording, wherein the controller is configured to perform:

first interval determining whether an interval, in the scanning direction, between the flushing area and the ejection area is less than a first predetermined interval;

when it is determined in the first interval determining that the interval is less than the first predetermined interval:

first moving the head in a first direction, which is directed from the one side to an other side in the scanning direction;

second moving the head in a second direction, which is directed from the other side to the one side and is opposite to the first direction, after the first moving; and third moving the head in the first direction after the second moving; and the second flushing during the first moving.

6. The liquid ejection device according to claim 3, wherein a flushing area, toward which the liquid is ejected from the plurality of nozzles in the second flushing, is located on one side in the scanning direction with respect to an ejection area toward which the liquid is ejected from the plurality of nozzles in the second recording, wherein the controller is configured to perform:

second interval determining whether an interval, in the scanning direction, between the flushing area and the ejection area is less than a second predetermined interval;

when it is determined in the second interval determining that the interval is less than the second predetermined interval:

when the head is moved from the one side to an other side in the scanning direction, causing the scanning mechanism to perform:

low-speed movement of moving the head at a first speed; and high-speed movement of moving the head at a second speed which is higher than the first speed; and the second flushing during the low-speed movement.

7. The liquid ejection device according to claim 3, wherein a flushing area, toward which the liquid is ejected from the plurality of nozzles in the second flushing, is located on one side in the scanning direction with respect to an ejection area toward which the liquid is ejected from the plurality of nozzles in the second recording, wherein the controller is configured to perform:

in the recording, a forward scanning operation to cause the scanning mechanism to move the head from an other side to the one side in the scanning direction while causing the plurality of nozzles to eject the liquid and a reverse scanning operation to cause the scanning mechanism to move the head from the one side to the other side in the scanning direction while causing the plurality of nozzles to eject the liquid;

operation determining whether each of a preceding scanning operation performed in the first recording and a succeeding scanning operation subsequent to the preceding scanning operation performed in the second recording is the forward scanning operation;

when it is determined in the operation determining that each of the preceding scanning operation and the succeeding scanning operation is the forward scanning operations, the second flushing while the head is moved by the scanning mechanism from the one side to the other side in the scanning direction and between the preceding scanning operation and the succeeding scanning operation; and after the second flushing, changing the voltage output to the head from the second flushing voltage to the recording voltage.

* * * * *